(12) United States Patent
Dupart et al.

(10) Patent No.: US 10,102,701 B2
(45) Date of Patent: Oct. 16, 2018

(54) SECURE ACCESS CONTROL METHOD WITH READER AND MOBILE TERMINAL, IN PARTICULAR SUCH AS A TELEPHONE TERMINAL

(71) Applicant: SYSTEMES ET TECHNOLOGIES IDENTIFICATION (STID), Greasque (FR)

(72) Inventors: Vincent Dupart, Saint-Maximin-la-Sainte-Beaume (FR); Jérôme Silve, Rousset (FR); Sylvain Poitrat, Greasque (FR)

(73) Assignee: SYSTEMES ET TECHNOLOGIES IDENTIFICATION (STID), Greasque (FR)

( * ) Notice: Subject to any disclaimer, the term of this patent is extended or adjusted under 35 U.S.C. 154(b) by 0 days.

(21) Appl. No.: 15/964,036

(22) Filed: Apr. 26, 2018

(65) Prior Publication Data

US 2018/0247477 A1    Aug. 30, 2018

Related U.S. Application Data

(63) Continuation of application No. 15/835,733, filed on Dec. 8, 2017, now Pat. No. 10,008,063, which is a (Continued)

(30) Foreign Application Priority Data

Jun. 8, 2015    (FR) ..................... 15 55216

(51) Int. Cl.
 *G07C 9/00* (2006.01)
 *G06K 17/00* (2006.01)
 (Continued)

(52) U.S. Cl.
 CPC ....... *G07C 9/00309* (2013.01); *G06F 3/0414* (2013.01); *G06F 21/32* (2013.01);
 (Continued)

(58) Field of Classification Search
 CPC .... G07C 9/00309; G06F 21/32; H04W 4/027; H04W 4/008
 (Continued)

(56) References Cited

U.S. PATENT DOCUMENTS 9,514,296 B2 * 12/2016 Kim .................. G06F 21/34
2011/0311052 A1 * 12/2011 Myers ............. G07C 9/00103
380/270

(Continued)

*Primary Examiner* — Steven Lim
*Assistant Examiner* — Kam Ma
(74) *Attorney, Agent, or Firm* — Burris Law, PLLC

(57) ABSTRACT

A secure access control method is provided that uses secure access control readers having radiocommunication associated to a microcontroller in connection with a remote processing unit and radiocommunication mobile terminals carried by a user. The method includes emitting an announcement signal having security parameters defining access conditions to mobile terminals that determines and evaluates the power of each signal, notifying the mobile terminal of an access action by the user on the mobile terminal or close reader, and translating it by an access pass. If the access pass and/or access conditions are met, a radiofrequency connection is established and inhibits the emission of the announcement signal by said close reader, and passes into an authentication phase.

12 Claims, 3 Drawing Sheets

Related U.S. Application Data continuation of application No. PCT/FR2016/051358, filed on Jun. 7, 2016.

(51) Int. Cl.

| | | |
|---|---|---|
| *H04M 1/725* | (2006.01) | |
| *H04W 12/08* | (2009.01) | |
| *H04W 12/06* | (2009.01) | |
| *H04W 4/02* | (2018.01) | |
| *G06F 3/041* | (2006.01) | |
| *H04W 48/16* | (2009.01) | |
| *H04W 8/00* | (2009.01) | |
| *G06K 9/00* | (2006.01) | |
| *H04L 29/06* | (2006.01) | |
| *G06F 21/32* | (2013.01) | |
| *H04W 4/80* | (2018.01) | |
| *H04W 88/02* | (2009.01) | |

(52) U.S. Cl.
CPC ..... *G06K 9/00288* (2013.01); *G06K 17/0022* (2013.01); *H04L 63/0492* (2013.01); *H04M 1/7253* (2013.01); *H04W 4/027* (2013.01); *H04W 4/80* (2018.02); *H04W 8/005* (2013.01); *H04W 12/06* (2013.01); *H04W 12/08* (2013.01); *H04W 48/16* (2013.01); *G07C 2209/63* (2013.01); *H04W 88/02* (2013.01)

(58) Field of Classification Search
USPC ............................................. 340/5.61
See application file for complete search history.

(56) References Cited

U.S. PATENT DOCUMENTS

| | | | |
|---|---|---|---|
| 2013/0136046 A1* | 5/2013 | Wurm ............... | H04W 48/16 370/311 |
| 2013/0281021 A1* | 10/2013 | Palin ................. | H04W 8/005 455/41.2 |
| 2014/0077929 A1* | 3/2014 | Dumas .............. | G07C 9/00571 340/5.61 |
| 2014/0360232 A1* | 12/2014 | Al-Kahwati ....... | G07C 9/00571 70/14 |
| 2015/0228137 A1* | 8/2015 | Chen ................. | G07C 9/00007 340/5.54 |
| 2016/0093126 A1* | 3/2016 | Frenette ............ | G07C 9/00571 340/5.6 |

\* cited by examiner

SECURE ACCESS CONTROL METHOD WITH READER AND MOBILE TERMINAL, IN PARTICULAR SUCH AS A TELEPHONE TERMINAL

CROSS-REFERENCE TO RELATED APPLICATIONS

This application is a continuation of U.S. application Ser. No. 15/835,733, filed on Dec. 8, 2017, which claims priority to International Application No. PCT/FR2016/051358, filed on Jun. 7, 2016, which claims priority to and the benefit of FR 15/55216 filed on Jun. 8, 2015. The disclosures of the above applications are incorporated herein by reference.

FIELD

The present disclosure relates to a secure access control method.

BACKGROUND

The statements in this section merely provide background information related to the present disclosure and may not constitute prior art.

In the field of access control, it is known to use secure access control readers comprising an active radio-identification chip in order to allow short-distance and contactless access control according to the RFID technology, generally by means of badges provided with a passive radio-identification chip.

It is also known to use, instead of such badges, mobile terminals of the telephone terminal (or smartphone) type implementing a secure radiocommunication with the secure access control reader according to a long-distance wireless communication protocol of the BLUETOOTH® type.

However, the long range of such a radiocommunication between the telephone terminal and the access control reader has a major drawback when several access control readers are located within the range of the telephone terminal, with risks of conflict giving rise to security flaws.

SUMMARY

The present disclosure provides a secure access control method adapted for secure radiocommunications according to long-distance wireless communication protocols, while allowing for an improved security level with several secure access control readers likely to be located within the range of a mobile terminal.

To this end, the present disclosure proposes a secure access control method using:

at least one secure access control reader comprising a box internally receiving radiocommunication device associated to a microcontroller in connection with a remote processing unit; and at least one radiocommunication mobile terminal, in particular of the telephone terminal type, carried by a user.

The access control method comprising an authentication phase at the end of which the microcontroller of an access control reader transmits authenticated identification data specific to the mobile terminal to the remote processing unit.

According to the present disclosure, the access control method is noteworthy in that, prior to the authentication phase, the method implements the following steps:

a) the or each access control reader repeatedly emits an announcement signal comprising security parameters defining at least one condition for access to a communication with the corresponding access control reader;

b) the mobile terminal receives, within a given range, the or each announcement signal and determines a receiving power of the or each announcement signal;

c) the mobile terminal evaluates the or each receiving power in order to establish a parameter called distance parameter reflecting the distance between the mobile terminal and the or each reader, and recognizes a reader as being a close reader depending on this evaluation;

d) the mobile terminal is notified of an action called access action initiated by the user on the mobile terminal or on the close reader and translates said access action by an access pass to said close reader, in particular depending on the distance parameter associated to said close reader, said access pass being representative of said access action;

e) the mobile terminal checks whether the access pass corresponds to an access condition defined by the security parameters contained in the announcement signal of said close reader; and f) if the access pass corresponds to an access condition and if the possible other access conditions are met, therefore the mobile terminal establishes a radiofrequency connection with the close reader, said radio frequency connection having the effect of inhibiting the emission of the announcement signal by said close reader, and finally the method passes into the authentication phase.

Thus, the mobile terminal establishes a radiofrequency connection (or radio-connection or radiocommunication) with a reader depending on its distance, and if the access condition(s) are respected in order to avoid untimely or unwanted communications.

In a particular use, during step b, the mobile terminal receives at least two announcement signals from at least two distinct readers; and during step c, the mobile terminal compares the receiving powers of each reader and determines the close reader as being that whose corresponding receiving power is the highest.

Thus, when several access control readers are located within the range of the mobile terminal, said mobile terminal can establish a radio connection only with the closest reader.

According to a possibility, during step e, the mobile terminal compares the receiving power of the announcement signal of the close reader with a predefined threshold and, during step f, the mobile terminal establishes a radiofrequency connection with the close reader if said receiving power is greater than said threshold.

Thus, a new condition is imposed based on this receiving power, the threshold being set to translate a proximity of the mobile terminal vis-a-vis the reader.

According to a feature, during step d, an access action corresponds to an approach, with or without contact, of the user, in particular of a user's hand, in the vicinity of a presence detection system integrated into the close reader, and the detection of said approach by said presence detection system causes the emission, by said close reader, of a new announcement signal comprising the security parameters and a detection index signaling the detection of said approach, and the mobile terminal receives the new announcement signal with said detection index and translates this detection index into an access pass representative of said approach.

Thus, the radio connection between the mobile terminal and the close reader is established only after detection of the approach of the user in the vicinity of the reader, unless other access conditions are imposed by the reader.

If the reader does not impose additional access conditions, the user might get past the secure access only by approaching the reader (in particular by approaching his hand), without having to handle his mobile terminal which might remain inside a garment or a bag worn by the user and which will necessarily be in the vicinity of the reader in order to exchange with it.

In a particular form, the presence detection system corresponds to a capacitive sensor integrated into the close reader, thus providing a capacitive detection, with or without contact, of the approach of the user's body vis-a-vis to the reader.

According to another feature, during step d, an access action corresponds to a pressure on a touch screen, in particular locally, held or along a predefined trajectory, or on a button of the mobile terminal, and the mobile terminal translates this pressure into an access pass representative of said pressure.

Thus, the radio-connection between the mobile terminal and the close reader is established only after pressing on the screen or on the button of the mobile terminal, unless other access conditions are imposed by the reader. The pressure on the touch screen may correspond to the pressure on a dedicated virtual button and symbolized by an icon on the touch screen, this virtual button being able, for example, to be present on a standby screen, a home screen or a screen of a page opened by a computer application.

According to another form of the present disclosure, during step d, an access action corresponds to a predefined impact or displacement movement of the mobile terminal detected by a movement detector, in particular of the accelerometer type, integrated into the mobile terminal, and the mobile terminal translates this detection by the accelerometer into an access pass representative of said predefined movement.

Thus, the radio-connection between the mobile terminal and the close reader is established only after the detection of the predefined movement by the movement detector.

This detection takes place when the mobile terminal is in standby mode or not, or only after launching a dedicated computer program, in particular a computer application on a mobile telephone. The movement detector thus detects a movement of the mobile terminal and the mobile terminal recognizes that this movement corresponds to the predefined movement to establish the radio-connection with the reader.

In a particular form, the predefined movement corresponds to an impact movement composed of a succession of at least two consecutive blows to the mobile terminal.

In this manner, the user makes do with typing on the mobile terminal, for example through the fabric of a garment pocket or a bag, in order to initiate the radio-connection between the mobile terminal and the reader and thus gets past the secure access.

According to another form of the present disclosure, during step d, an access action corresponds to an unlocking action of the mobile terminal in order to cause it to exit its standby mode, and the mobile terminal translates this unlocking into an access pass representative of said unlocking.

In this particular case, the mobile terminal establishes a radio-connection with the close reader if the mobile terminal is unlocked, and not on standby, unless another access conditions are imposed by the reader.

According to another form of the present disclosure, during step d, an access action corresponds to the activation of an access computer program stored in the mobile terminal, in particular accessible in the form of an application for mobile phone, and the mobile terminal translates this activation into an access pass representative of said activation of the computer program.

Thus, the radio-connection between the mobile terminal and the close reader is established only after the activation of the computer program, unless other access conditions are imposed by the reader.

Optionally and advantageously, prior to the authentication phase, it is possible to expect a complementary identification step based on an identification action of the user of the mobile terminal, said identification action including a predefined action on the mobile terminal to generate an identification signal which is received and analyzed by the microcontroller in order to authorize the passage to the authentication phase.

Thus, in addition to the cryptographic authentication of the identification data by the reader, the method takes advantage of the mobile terminal in order to provide complementary identification by exploiting the calculation possibilities offered by the mobile terminal.

Advantageously, the complementary identification step is managed by the computer program previously activated on the mobile terminal.

In accordance with another feature of the present disclosure, the identification action corresponds to an input of a code on a keyboard of the mobile terminal, or to a biometric control on a biometric device integrated into the mobile terminal, or to a facial recognition using an image capturing by a camera integrated into the mobile terminal, or to a voice recognition using a sound recording by a microphone integrated into the mobile terminal.

According to a possibility, the emission of the announcement signal by each access control reader and the radio-connection between the mobile terminal and the concerned access control reader are established according to a long-distance wireless communication protocol of the BLUETOOTH®, WIFI®, WIBREE®, WIMAX®, LORA®, ZIGBEE® type or the like.

According to another possibility, each access control reader also comprises at least one complementary access control system selected from the list comprising:

an active radio-identification chip to allow a complementary access control according to the RFID technology;

a biometric control device to allow a complementary access control by biometry;

an image capturing device to allow a complementary access control by facial recognition; and a keyboard to allow a complementary access control by inputting a code.

Thus, several possibilities are offered for the secure access with such a reader, either with a mobile terminal as previously described, or with a complementary access control system which will involve using an RFID badge (active or passive badge) for the active radio-identification chip, or knowing a code with the keyboard (in the form of a touch screen or in the form of a keypad), or performing a biometric control (fingerprint, retina, iris, . . . ), or performing an image capturing for a facial recognition.

According to another feature, during step d, the mobile terminal is notified of the access action without this warning being linked to the determination of the receiving power carried out during step b.

In other words, it is not the determination of the receiving power carried out during step b which will serve as a warning of the access action. In this way, the determination of the receiving power carried out during step b will not serve as a trigger for switching to step d which will lead the mobile terminal to translate an access action into an access pass.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
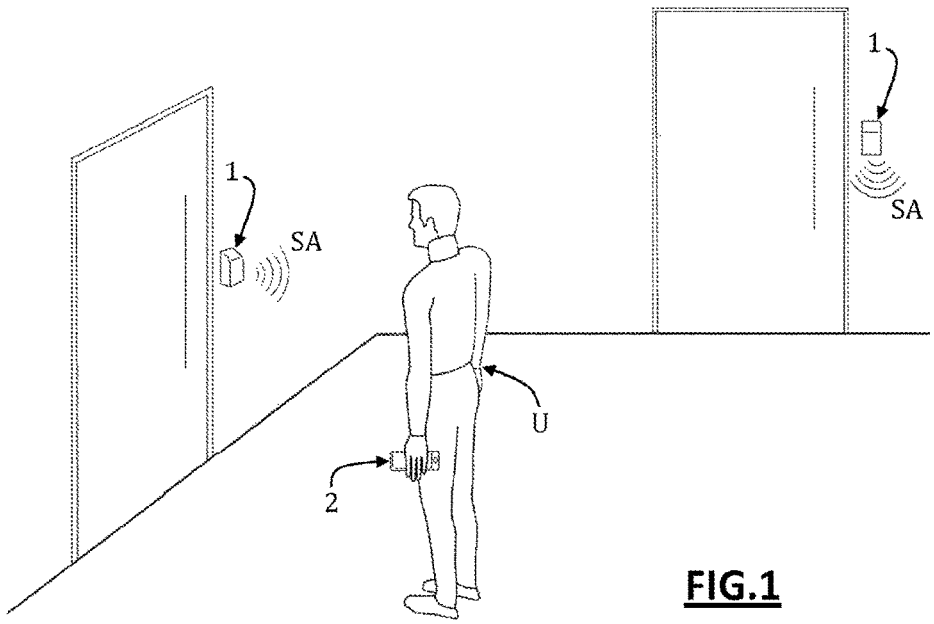
FIG. 1 illustrates a secure access control method in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Other features and advantages of the present disclosure will appear upon reading the following detailed description, of a non-limiting example of implementation, made with reference to the appended figures in which FIGS. 1 to 6 illustrate different situations and steps during the implementation of an access control method in accordance with the present disclosure.

With reference to FIG. 1, the method in accordance to the present disclosure is implemented with at least two secured access control readers 1 and at least one radiocommunication mobile terminal 2 carried by a user U. The method may also be implemented with a single reader 1.

Each reader 1 comprises a housing internally receiving radiocommunication device according to a long-distance wireless communication protocol of the BLUETOOTH®, WIFI®, WIBREE®, WIMAX®, LORA®, ZIGBEE® type or the like, associated to a microcontroller in (wireless or wired) connection with a remote processing unit (not illustrated).

The mobile terminal 2 is a telephone terminal, of the smartphone type, but might also be a digital tablet, a personal digital assistant or a badge or key fob called intelligent key fob equipped with a battery and an electronic card or chip.

This mobile terminal 2 integrates radiocommunication device according to a long-distance wireless communication protocol of the BLUETOOTH®, WIFI®, WIBREE®, WIMAX®, ZIGBEE® type or the like, in order to be capable of communicating with the readers 1, as well as control electronics.

The mobile terminal 2 also integrates a touch screen and a movement detector, such as for example an accelerometer and in particular a three-dimensional accelerometer.

With reference to FIG. 1, in a step a), each reader 1 repeatedly emits, in particular periodically, an announcement signal SA comprising, in its frame, status parameters and security parameters. The status parameters translate the status or the state of the reader 1 and indicate, in initial operation, a free or available status. The security parameters define at least one condition of access to a communication with the reader 1.

With reference to FIG. 1, in a step b), when a user U, carrying a mobile terminal 2, is located within the range of at least two readers 1, the mobile terminal 2 receives the announcement signals SA of the different readers 1. In this particular case, the mobile terminal 2 determines a receiving power of each announcement signal SA.

Afterwards, in a step c), the mobile terminal 2 compares these receiving powers and determines the close reader 1 as being that whose corresponding receiving power is the highest. In the example of FIG. 1, the close reader 1 is the one on the left. The mobile terminal 2 also compares these receiving powers with a predetermined power threshold.

Then, in a step d), the mobile terminal 2 is notified of an action called access action initiated by the user U on the mobile terminal 2 or on the close reader 1, and translates this access action by an access pass representative of said access action.

Figure 2:
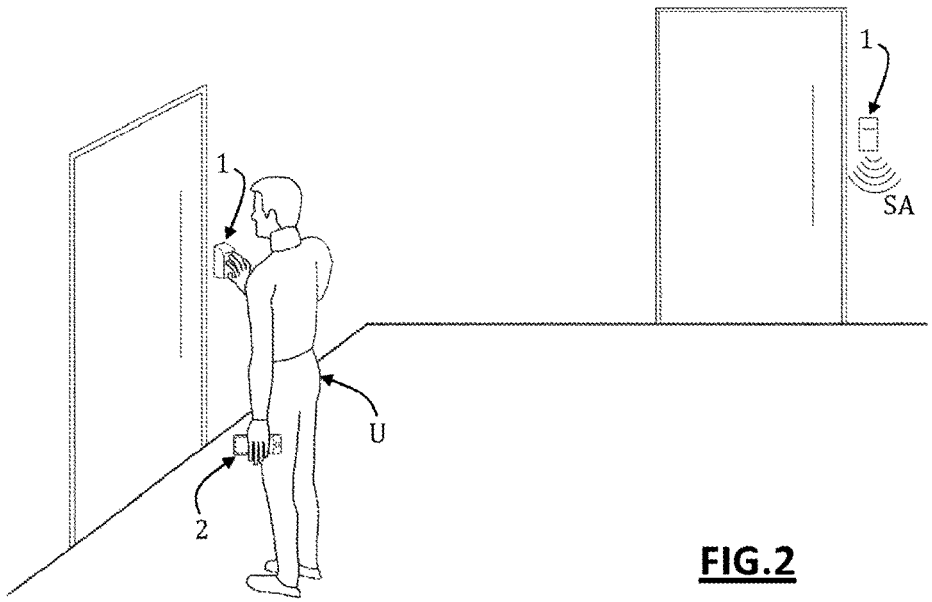
FIG. 2 illustrates an access action corresponding to presence detection of a user's hand in accordance with the present disclosure.

With reference to FIG. 2, a possible access action corresponds to an approach, with or without contact, of the hand of the user U in the vicinity of a presence detection system (in particular of the capacitive sensor type) integrated into the close reader 1.

This detection of the approach or the presence of the hand by the presence detection system causes the emission, by the close reader 1, of a new announcement signal comprising, in its frame, the status parameters and the security parameters, where the security parameters are unchanged and the status parameters indicate a "presence detection" status following the detection of the approach of the hand. In other words, the new announcement signal comprises a detection index (in the status parameters) which signal the detection of the approach of the hand.

Thus, the mobile terminal 2 is noticed of this approach action of the hand by receiving the new announcement signal with this detection index, and the mobile terminal 2 translates this detection index into an access pass representative of said approach of the hand. It should be noted that, in this particular case, the user U can keep his mobile terminal 2 in his hand, in his pocket or in a bag, unless other access conditions involve acting on the mobile terminal 2.

Figure 3:
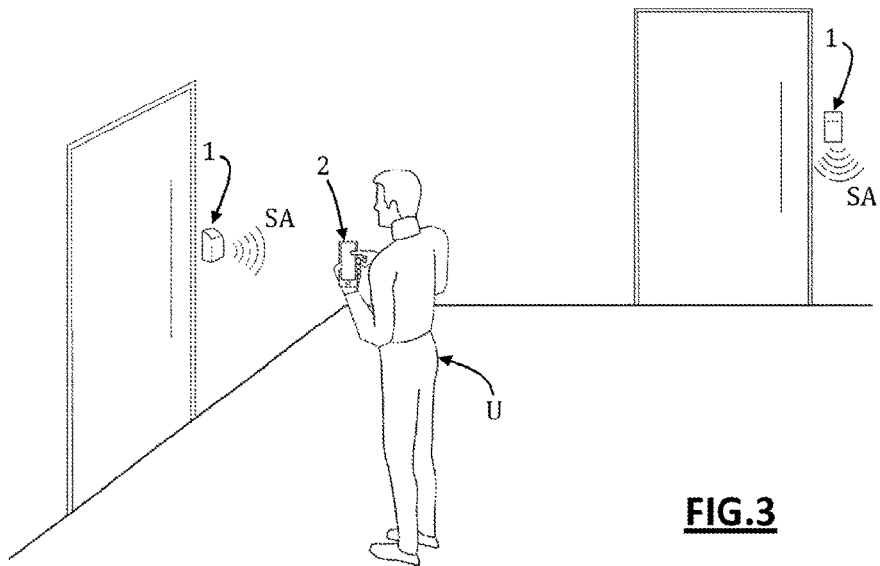
FIG. 3 illustrates an access action corresponding to pressure and/or an unlocking action of a mobile terminal in accordance with the present disclosure.

With reference to FIG. 3, a possible access action corresponds to a pressure, with one or more finger(s), on the touch screen of the mobile terminal 2 (alternatively, this pressure may be exerted on a button of the mobile terminal 2).

This pressure may be performed on a virtual button present on the standby screen of the mobile terminal 2, or visible only after opening/activating a computer program (for example a computer application on a smartphone).

This pressure may be also performed in a dedicated interface (in particular within a dedicated application) and along a predefined trajectory, in order to define a predefined symbol. The mobile terminal then translates this pressure into an access pass representative of said pressure.

Also with reference to FIG. 3, a possible access action corresponds to the activation of an access computer program stored in the mobile terminal 2, in particular in the form of a smartphone application. Conventionally, this activation is carried out by clicking, on the touch screen, on a dedicated icon. The mobile terminal translates this activation into an access pass representative of said activation of the computer program.

Also with reference to FIG. 3, a possible access action corresponds to an unlocking action of the mobile terminal 2 in order to switch it from a standby mode to an activated or awake mode; this unlocking action being carried out conventionally by pressing on a button or on the touch screen. The mobile terminal 2 translates this unlocking into an access pass representative of said unlocking.

Figure 4:
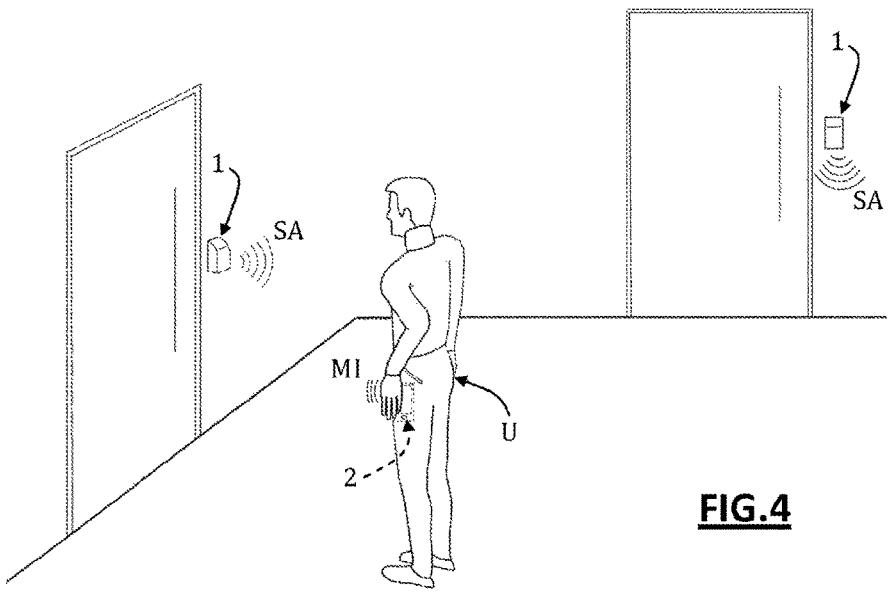
FIG. 4 illustrates an access action corresponding to a predefined impact movement of a mobile terminal in accordance with the present disclosure.

With reference to FIG. 4, a possible access action corresponds to a predefined impact movement MI of the mobile terminal 2 detected by the movement detector (not illustrated) integrated into the mobile terminal 2, in other words a movement during which the mobile terminal 2 undergoes at least one impact or shock, of small magnitude to avoid damaging the mobile terminal 2.

Concerning the type of impact movement MI, it may for example be a movement during which the user U applies a succession of at least two consecutive blows to the mobile terminal 2.

As shown in FIG. 4, the mobile terminal 2 may remain in a garment pocket (or in a bag) during this impact movement MI. This impact movement may be detected while the mobile terminal 2 is in the standby mode. The mobile terminal 2 translates this detection of an impact or of a succession of impacts by the movement detector into an access pass representative of said predefined impact movement.

Figure 5:
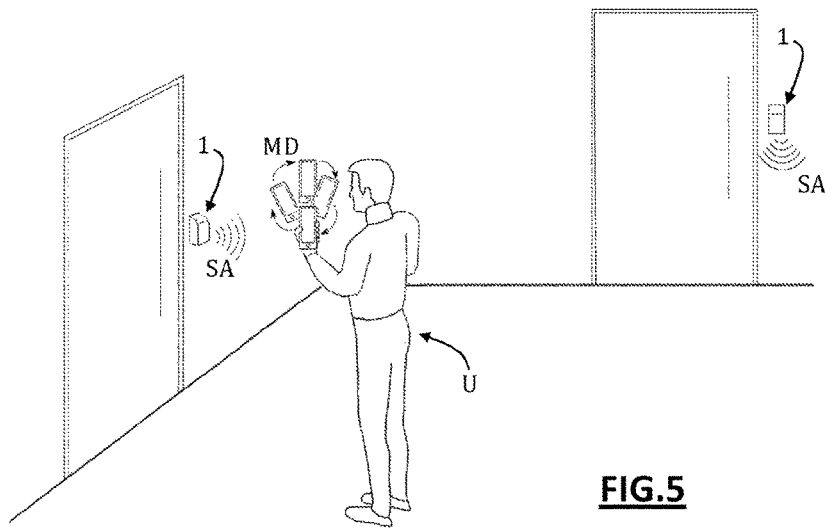
FIG. 5 illustrates an access action corresponding to a predefined displacement movement of a mobile terminal in accordance with the present disclosure.
Figure 6:
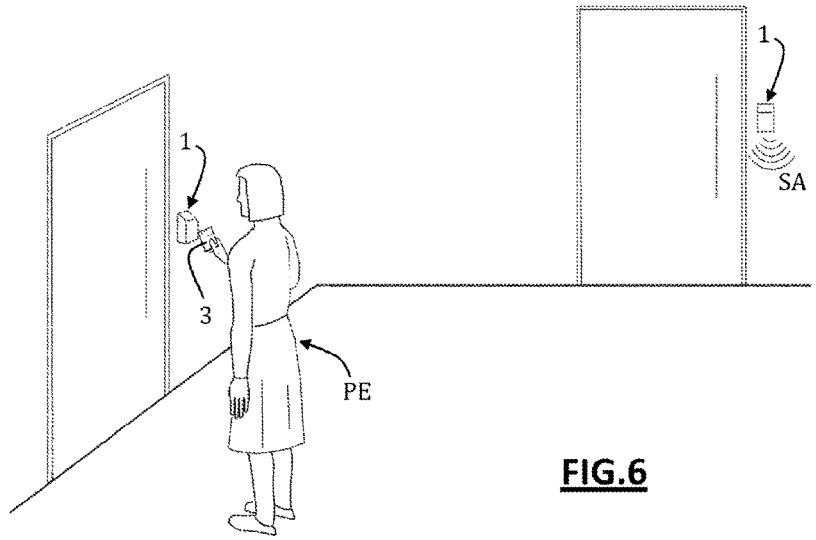
FIG. 6 illustrates a complementary access control system in accordance with the present disclosure.

With reference to FIG. 5, a possible access action corresponds to a predefined displacement movement MD of the mobile terminal 2 detected by the movement detector (not illustrated) integrated into the mobile terminal 2.

Concerning the type of displacement movement MD, it may for example be a movement during which the user U takes in hand the mobile terminal 2 and makes it follow a predefined trajectory in the space, for example by making it follow a trajectory of a given shape as illustrated schematically and by way of example in FIG. 5 with a substantially circular trajectory.

This displacement movement MD may be detected while the mobile terminal 2 is in standby mode, or after opening a dedicated computer program. The mobile terminal 2 translates this detection by the movement detector into an access pass representative of said predefined displacement movement MD.

Afterwards, during step e, the mobile terminal 2 checks the or all the access condition(s) defined by the security parameters contained in the announcement signal SA of the close reader 1 are met, in other words it checks whether the or each access pass corresponds to an access condition.

In the case of the example of FIG. 2, during step e, the mobile terminal 2 checks whether said access pass representative of the approach of the hand corresponds to an access condition and, it compares the receiving power of the new announcement signal with a predefined power threshold.

Thus, a new condition is translated by this power comparison such that, during step f, the mobile terminal 2 establishes a radio-connection with the close reader 1 if this receiving power is greater than said power threshold, this threshold being calculated to translate the proximity of the mobile terminal 2 vis-a-vis the reader 1.

Then, during a step f, if the access conditions are met, therefore the mobile terminal 2 establishes a radio-connection with the close reader 1, this radio-connection having the effect of inhibiting the emission of the announcement signal SA by said reader 1, in other words this radio-connection causes the cessation of the emission of the announcement signal SA by the close reader 1. At the end, the method passes into an authentication phase.

By ceasing to emit the announcement signal SA, no other mobile terminal 2 may enter into a radio-connection with the close reader 1, and this reader 1 accordingly becomes invisible for possible other mobile terminals 2 present in the environment.

During the authentication phase, the mobile terminal 2 transmits its identification data and the microcontroller of the close reader 1 authenticates its identification data and, then, transmits its authenticated identification data to the remote processing unit.

This authentication phase may be of the type with simple or mutual authentication.

By way of example, during a simple authentication, the mobile terminal 2 and the close reader 1 enter into a secure radio-connection and successively:

the reader 1 communicates to the mobile terminal 2 its own identifier (such as, for example, a serial number);

the mobile terminal 2 calculates a signature from this identifier of the reader 1 and also from the identification data of the mobile terminal 2;

the mobile terminal 2 transmits to the reader 1 its identification data as well as this signature; and the microcontroller of the reader 1 checks with the signature the authenticity of the identification data, before transmitting said identification data to the remote processing unit.

The microcontroller of the reader 1 may authenticate the identification data with the public key of a public/private key pair, this public key being stored in a memory, such as a secure memory, associated to the microcontroller.

The processing unit will then recover these identification data for the purpose of processing and deciding one or more action(s), such as for example, unlocking an access, launching an alert, actuating a home control system, creating passage information history, etc.

Additionally, it may be expected that, prior to the authentication phase, the method implements a complementary identification step based on an identification action of the user U of the mobile terminal 2, this identification action includes a predefined action on the mobile terminal 2 for generating an identification signal which is received and analyzed by the microcontroller in order to authorize the transmission of the authenticated identification data specific to the mobile terminal to the remote processing unit.

In other words, although the access conditions are met, it may be expected to request the user U to carry out an identification action in order to obtain access, this identification action being performed on the mobile terminal 2. This identification action may be carried out on an interface of a dedicated computer program of the mobile terminal 2, and may include the input of a code, a biometric control, a facial recognition or voice recognition.

The reader 1 may also integrate at least one complementary access control system (not illustrated) selected from the list comprising:

an active radio-identification chip to allow a complementary access control according to the RFID technology; a biometric control device to allow a complementary access control by biometry, in particular by fingerprint, retina or iris control; an image capturing device, such as a digital camera, to allow a complementary access control by facial recognition; and a keyboard to allow a complementary access control by inputting a code.

Thus, and as illustrated in FIG. 6, a person PE not holding a mobile terminal 2 adapted for the implementation of the previously described method, may obtain access by means of such a complementary access control system.

In the example of FIG. 6, the person PE holds a badge 3 provided with a passive RFID chip which communicates with an active radio-identification chip integrated into the reader 1, in order to obtain the access.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A secure access control method using at least one secure access control reader comprising a box internally receiving radiocommunication device associated to a microcontroller in connection with a remote processing unit and at least one radiocommunication mobile terminal, in particular of the telephone terminal type, carried by a user, said secure access control method comprising:
   repeatedly emitting an announcement signal from the at least one secure access control reader to a radiocommunication mobile terminal, the announcement signal comprising security parameters defining at least one access condition for access to a communication with a corresponding access control reader;
   determining a receiving power of the announcement signal;
   evaluating the receiving power in order to establish a distance parameter translating a distance between the radiocommunication mobile terminal and a reader, and recognizes a secure access control reader as being a close reader depending on said evaluation of the receiving power;
   notifying the radiocommunication mobile terminal of an access action initiated by the user on the radiocommunication mobile terminal or on the close reader and translating said access action by an access pass to said close reader, said access pass being representative of said access action;
   checking whether the access pass corresponds to an access condition defined by security parameters contained in the announcement signal of said close reader;
   establishing a radiofrequency connection with the close reader if the access pass corresponds to at least one access condition is met, said radio frequency connection having the effect of inhibiting the emission of the announcement signal by said reader, and finally the method passes into the authentication phase;
   transmitting authenticated identification data specific to said radiocommunication mobile terminal from the microcontroller to a remote processing unit; and
   authenticating the identification data,
   wherein the access action corresponds to a predefined impact or displacement movement of the radiocommunication mobile terminal detected by an accelerometer integrated into the radiocommunication mobile terminal, and the radiocommunication mobile terminal translates the detection by the accelerometer into an access pass representative of said predefined movement.

2. The secure access control method according to claim 1, wherein the predefined movement corresponds to an impact movement comprising a succession of at least two consecutive blows to the radiocommunication mobile terminal.

3. The secure access control method according to claim 1, wherein at least two distinct secure access control readers repeatedly emit an announcement signal and the radiocommunication mobile terminal receives at least two announcement signals from the at least two distinct secure access control readers and determines the receiving powers of each announcement signal, and the radiocommunication mobile terminal compares the receiving powers of each secure access control reader and determines the close reader as being that whose corresponding receiving power is the highest.

4. The secure access control method according to claim 3, wherein the radiocommunication mobile terminal compares the receiving power of the announcement signal of the close reader with a predefined threshold and the radiocommunication mobile terminal establishes a radiofrequency connection with the close reader if said receiving power is greater than said threshold.

5. The secure access control method according to claim 1, wherein, prior to transmitting authenticated identification data, a complementary identification step is provided, based on an identification action of the user of the radiocommunication mobile terminal, said identification action comprising a predefined action on the radiocommunication mobile terminal to generate an identification signal which is received and analyzed by the microcontroller in order to authorize the transmission of the authenticated identification data specific to the radiocommunication mobile terminal to the remote processing unit.

6. The secure access control method according to claim 5, wherein the complementary identification step is managed by a computer program activated beforehand on the radiocommunication mobile terminal.

7. The secure access control method according to claim 5, wherein the identification action corresponds to an input of a code on a keyboard of the radiocommunication mobile terminal, a biometric control on a biometric device integrated into the radiocommunication mobile terminal, a facial recognition using an image capturing by a camera integrated into the radiocommunication mobile terminal, or to a voice recognition using a sound recording by a microphone integrated into the radiocommunication mobile terminal.

8. The secure access control method according to claim 1 wherein the emission of the announcement signal by each secure access control reader and the radiocommunication between the radiocommunication mobile terminal and the concerned access control reader are established according to a long-distance wireless communication protocol.

9. The secure access control method according to claim 1, wherein the secure access control reader further comprises at least one complementary access control system selected from the group consisting of an active radio-identification chip to allow a complementary access control according to the RFID technology, a biometric control device to allow a complementary access control by biometry, an image capturing device to allow a complementary access control by facial recognition, and a keyboard to allow a complementary access control by inputting a code.

10. The secure access control method according to claim 1, wherein the radiocommunication mobile terminal is notified of the access action without a warning being linked to the determination of the receiving power of the announcement signal.

11. The secure access control according to claim 1, wherein the radiocommunication mobile terminal is a telephone terminal.

12. The secure access control method according to claim 1, wherein the radiocommunication mobile terminal translates the access action by an access pass to said close reader depending on a distance parameter associated to said close reader.

* * * * *